United States Patent [19]
O'Brien, Jr.

[11] Patent Number: 5,174,803
[45] Date of Patent: Dec. 29, 1992

[54] APPARATUS FOR HEATING GLASSY TUBES

[75] Inventor: William D. O'Brien, Jr., Lilburn, Ga.

[73] Assignee: AT&T Bell Laboratories, Murray Hill, N.J.

[21] Appl. No.: 822,399

[22] Filed: Apr. 2, 1992

Related U.S. Application Data

[60] Division of Ser. No. 537,201, Jun. 12, 1990, Pat. No. 5,090,978, which is a continuation of Ser. No. 238,373, Aug. 30, 1988, abandoned.

[51] Int. Cl.$^5$ ............... C03B 23/04; C03B 37/00
[52] U.S. Cl. ........................ 65/271; 65/3.12; 65/12; 65/109; 65/292
[58] Field of Search ........... 65/2, 3.12, 12, 109, 65/271, 292

[56] References Cited

U.S. PATENT DOCUMENTS

| | | | |
|---|---|---|---|
| 3,816,149 | 4/1975 | Futerko | 239/398 |
| 4,231,777 | 11/1980 | Lynch | 65/109 |
| 4,401,267 | 8/1983 | Spainhour | 239/132.3 |
| 4,433,970 | 2/1984 | Spainhour | 431/8 |
| 4,477,244 | 10/1984 | Nis et al. | 432/11 |
| 4,477,273 | 10/1984 | Lynch et al. | 65/3.12 |
| 4,645,451 | 2/1987 | Schneider et al. | 65/109 |

Primary Examiner—Robert L. Lindsay
Attorney, Agent, or Firm—E. W. Somers

[57] ABSTRACT

A preform tube (31) is caused to be collpased into a preform rod by causing a heat zone (54) provided by a torch assembly (50) to traverse the tube longitudinally in a plurality of passes. During this so-called collapse mode, a muffle tube (100) encloses that portion of the tube which extends through the torch assembly. Advantageously, the muffle tube projects a predetermined distance beyond one major face of the torch assembly. The torch assembly comprises annular semi-circular end plates and as annular semi-circular center portion having a plurality of exit ports through which gases are directed into engagement with the tube. The center portion is caused to be recessed between the end plates thereby causing the heat zone generated by the gases to be narrowed. The narrowing of the heat zone and the substantial confinement of the heat energy within the muffle tube cooperate with increased gas flow rates to cause the tube to be collapsed in a time period which is substantially less than that achieved by prior art methods.

9 Claims, 4 Drawing Sheets

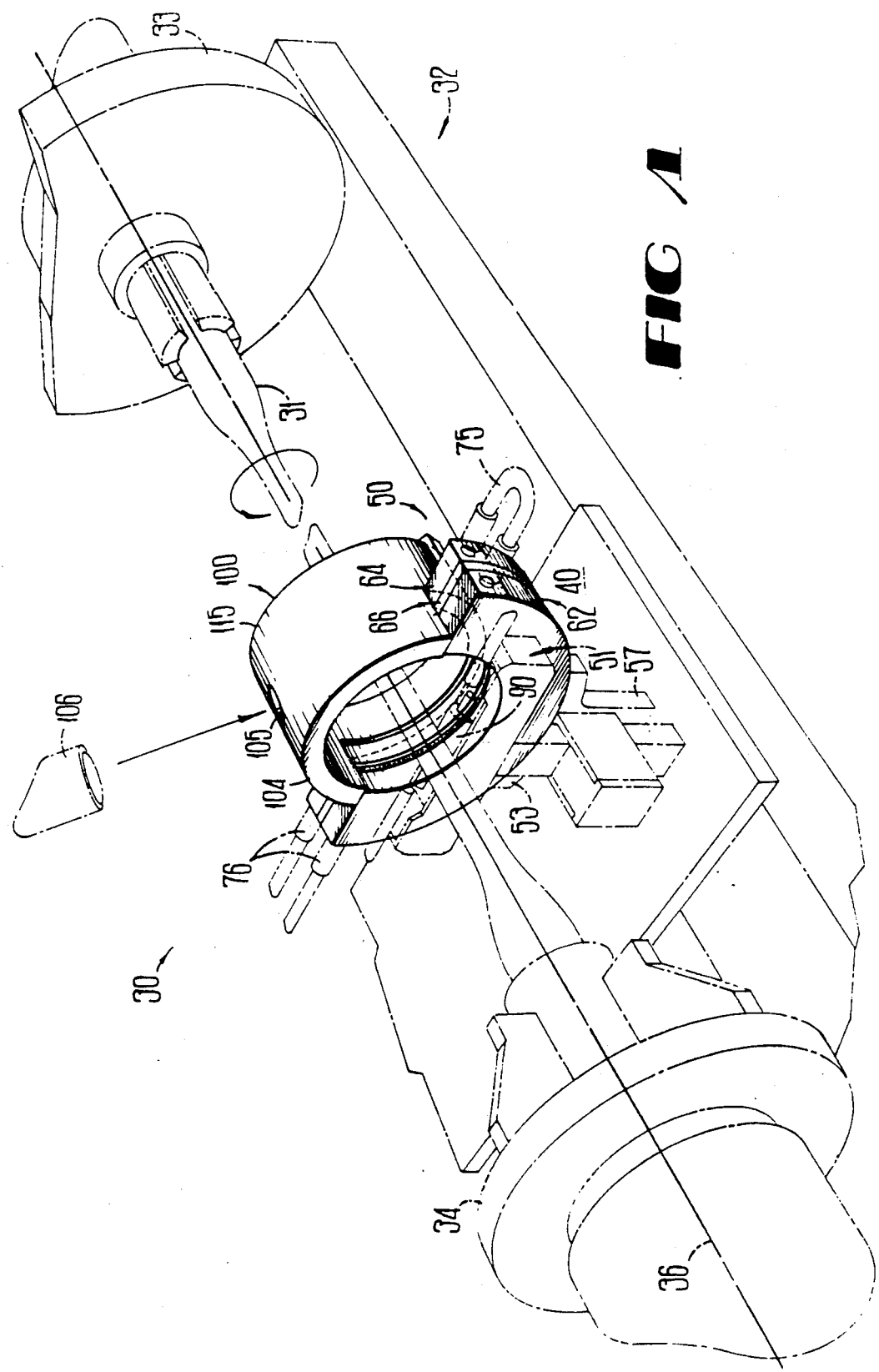

APPARATUS FOR HEATING GLASSY TUBES

This is a division of application Ser. No. 07/537,201 filed Jun. 12, 1990 now U.S. Pat. No. 5,090,978, granted Feb. 25, 1992 which is a continuation of application Ser. No. 07/238,373 filed Aug. 30, 1988 now abandoned.

TECHNICAL FIELD

This invention relates to apparatus for heating glassy tubes. More particularly, this invention relates to apparatus to facilitate collapse of an optical preform tube into a preform from which optical fiber is drawn.

BACKGROUND OF THE INVENTION

There are several different techniques for producing optical fiber for use in communications. One such technique comprises directing a constantly moving stream of reactants and oxygen through a glass substrate tube having a generally circular cross-section. The oxygen stream carries silicon tetrachloride and dopants to produce the desired index of refraction in the finished optical fiber. The substrate glass is heated to a reaction temperature within a moving hot zone that traverses the length of the tube, and the consequent reaction produces doped silicon dioxide fused into a continuous layer on the inner wall of the tube. The resulting tube is referred to as a preform tube. See for example, U.S. Pat. No. 4,217,027 which issued on Aug. 12, 1980 in the names of J. B. MacChesney and P. B. O'Connor.

A torch assembly for heating a glass substrate tube to facilitate deposition of the reactants in the above-described process is described in U.S. Pat. No. 4,231,777 which issued on Nov. 4, 1980, in the names of B. Lynch and F. P. Partus. See also U.S. Pat. No. 4,401,267 which issued on Aug. 30, 1983 in the name of C. D. Spainhour. Initially, one end of the tube is supported in the headstock of a lathe and the other end is welded to an exhaust tube that is supported in the tailstock. Combustible gases are directed through a housing and gas outlets of the torch assembly and toward the tube as it is turned rotatably about its longitudinal axis and as the torch assembly is moved therealong on a carriage to produce a moving hot zone. A temperature profile is produced across the hot zone which moves along on the surface of the tube to accomplish the desired reaction and deposition. See F. P. Partus, and M. A. Saifi "Lightguide Preform Manufacture" beginning at page 39 of the Winter 1980 issue of the *Western Electric Engineer*.

During a deposition mode, the torch carriage moves slowly from the headstock of the lathe where dopants are moved into the glass tube to the tailstock where gases are exhausted. At the end of each pass from headstock to tailstock, the torch carriage is returned rapidly to the headstock for the beginning of another cycle. The ends of the gas outlets adjacent to the tube are cooled to eliminate substantially degradation by oxidation or reduction, for example, of the material forming the housing and gas outlets. In one embodiment of this technique, a plasma is established in the tube to enhance certain processes in reaction and deposition.

Subsequent to the deposition mode, a collapse mode is used to cause the preform tube to become a solid rod-like member which is called a preform. It is this preform from which lightguide fiber is drawn. See D. H. Smithgall and D. L. Myers "Drawing Lightguide Fiber" beginning at page 49 of the hereinbefore identified Winter 1980 issue of the *Western Electric Engineer*.

In order to collapse the preform tube, the torch assembly is moved in a number of passes from the headstock to the tailstock and then in a plurality of passes from the tailstock to headstock. The temperature of the moving hot zone which is higher during the collapse mode than during the deposition mode softens the tube wall and allows surface tension to cause the tube to collapse into a rod. During the collapse mode, straightening methods disclosed in U.S. Pat. No. 4,477,273 which issued on Oct. 16, 1984 in the names of B. Lynch and F. P. Partus may be used to cause the resultant preform to be substantially straight. The process of collapsing a preform tube may consume as much time as four and one-half hours.

There has long been a desire to reduce the time required to collapse a preform tube into a preform. A solution to this problem will yield significant dividends as the costs are directly proportional to the time required for this step.

Seemingly, the prior art is devoid of a solution to this problem. Techniques have been proposed but none has met wide acceptance. An acceptable solution to this problem which should be able to be used with present straightening techniques should yield a lower cost preform having exceptional straightness.

SUMMARY OF THE INVENTION

The foregoing problem of the prior art has been solved by the apparatus of this invention. A method of heating a tube to induce its collapse includes the step of supporting the tube at its ends for rotation about a longitudinal axis thereof. An outer surface of the tube is heated by directing a flow of gases through a torch assembly toward a portion of the length of the tube. Each successive increment of length of the tube is exposed to a zone of heat having a temperature profile by causing relative motion between the zone of heat and the tube while the tube is being rotated. As the tube is rotated, it is collapsed into a solid rod as the heat energy is confined and directed in a narrow band into engagement with the tube. At least a substantial portion of the zone of heat is confined about substantially the entire circumference of the tube along a portion of the length of the tube. The heat energy is confined by a muffle tube which overhangs at least one side of the torch assembly and which encloses the circumference of that portion of the tube which extends through the torch assembly and an additional portion of the tube which extends beyond the torch assembly. Gases are caused to be directed from the torch assembly into engagement with the portion of the length of the tube in a manner which results in a relatively narrow maximum temperature portion of the zone of heat. This is accomplished by causing the flow paths of the gases as they emerge from passageways of the torch assembly to be confined laterally for a predetermined distance.

In the manufacture of a preform tube from which optical fiber is drawn, a substrate tube, having a generally circular cross-section, is supported rotatably at its ends. The substrate tube is turned rotatably and heated to an initial temperature while doped reactants are deposited in the tube to form a predetermined profile. During deposition, the temperature of the tube is increased from the initial temperature as the number of passes increase. Then, the outer surface of the tube is heated to a temperature within a range which is higher than the initial temperature by the moving zone of heat and the tube is collapsed into a rod in accordance with the foregoing method. Afterwards, optical fiber is drawn from the rod.

In an apparatus for collapsing an elongated glass preform tube having a circular cross-section and a deposited core, facilities are provided for holding ends of the tube to allow rotation about its longitudinal axis. The apparatus includes a torch for heating the preform tube. Relative motion is caused between a zone of heat which is produced by the torch and the preform tube in a plurality of passes to cause successive increments of the length of the tube to be heated while it is turned rotatably.

The heat energy provided by the torch is confined by a muffle tube which encloses the preform tube from one side of the torch to the other for a predetermined distance on that side of the torch which is the trailing side during an initial portion of the deposition mode.

Further, the torch is modified to optimize the application of the maximum temperature portion of the heat zone. This is done by recessing a center portion of the torch which includes exit ports for the combustible gases with respect to portions contiguous thereto, thereby causing the heat zone to be narrowed. As a result, the heat energy is somewhat confined and is more concentrated. The use of the muffle tube in cooperation with the partial confinement of the flow paths of the gases causes collapse in a substantially shorter period of time than with prior art apparatus.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of an arrangement which is used to deposit layers of glassy materials on an inner wall of a glass substrate tube to provide a preform tube and for then causing the tube to be collapsed into a preform from which optical fiber is drawn;

DETAILED DESCRIPTION

Figure 3:
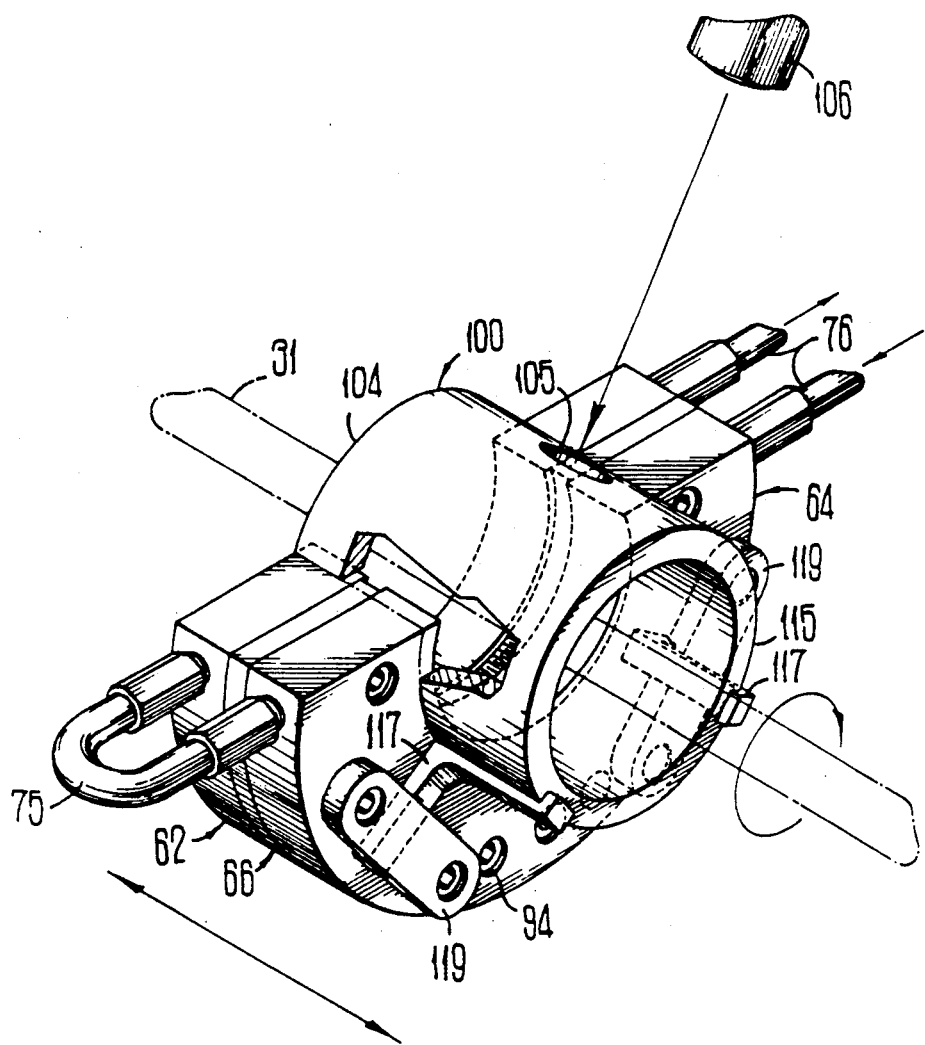
FIG. 3 is a perspective view of a torch assembly comprising a muffle tube which encloses that portion of the preform tube that extends through the torch assembly and which extends to one side of the torch assembly and also comprising provisions for narrowing the zone of heat.

Referring now to FIG. 1, there is shown an apparatus, designated generally by the numeral 30, for heating and collapsing a glass tube to manufacture a solid silica glass preform from which a optical fiber is drawn. During a deposition mode, a substrate tube 31 is heated in order to cause the reaction products of gases and/or dopants being fed into the tube to be fused to the inside wall thereof to provide a preform tube having an optically suitable profile for communications use. In this description, the numeral 31 is used to designate both the substrate tube and the preform tube. The heating of the glass tube 31 is carried out while gas phase reactants are delivered to the tube. A system for this delivery is disclosed in U.S. Pat. No. 4,276,243 which issued on Jun. 30, 1981, in the name of F. P. Partus.

The apparatus 30 generally comprises a lathe 32 having a headstock 33 and a tailstock 34 which are used to support the glass starting tube 31 for rotation about its longitudinal axis 36. The lathe 32 also includes a carriage 40 which is mounted for reciprocal movement along the lathe. Mounted on the carriage 40 is a torch assembly which is designated generally by the numeral 50 and a collapsing device which is designated by the numeral 51.

Figure 2:
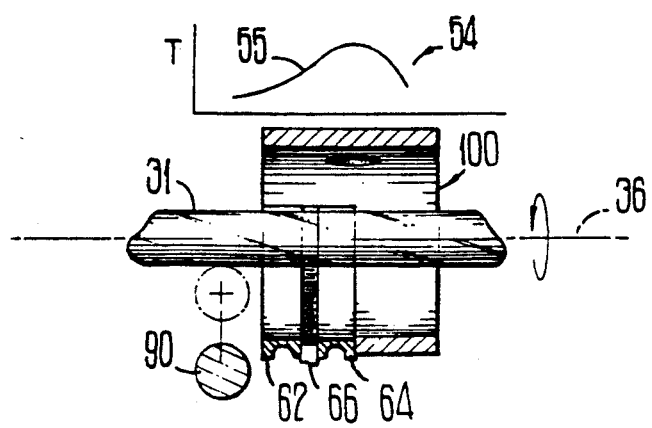
FIG. 2 is a view of a portion of a torch assembly, a portion of a straightening device and a temperature profile across a zone of heat which traverses the tube.

The torch assembly 50 is adapted to cause a flow of combustible gases to produce flames which are directed toward the tube 31. By confining the heat from the burning gases to a desired surface area of the tube, the torch assembly 50 establishes a zone of heat 54 (see FIG. 2) having a temperature profile 55 at the surface of the tube. The mounting of the torch assembly 50 on the carriage 40 and its movement relative to the tube 31 causes the zone of heat, which may be referred to as a hot zone, to be moved along the length of the tube. The torch assembly 50 is supported by a bracket 53 which is supported from a post 57 that is mounted on the carriage 40. Through adjustment of the bracket 53, the torch assembly 50 may be moved within any one of a range of distances from the tube 31 or to any one of a plurality of positions about and spaced from the tube.

The torch assembly 50 is described in relation to its use for heating glass tubes as material is deposited on the inside surface thereof and to provide elevated temperatures to collapse such tubes. However, such description is for purposes of exposition and not for limitation for the instant torch assembly may be used advantageously to heat other articles having various geometries.

Figure 4:
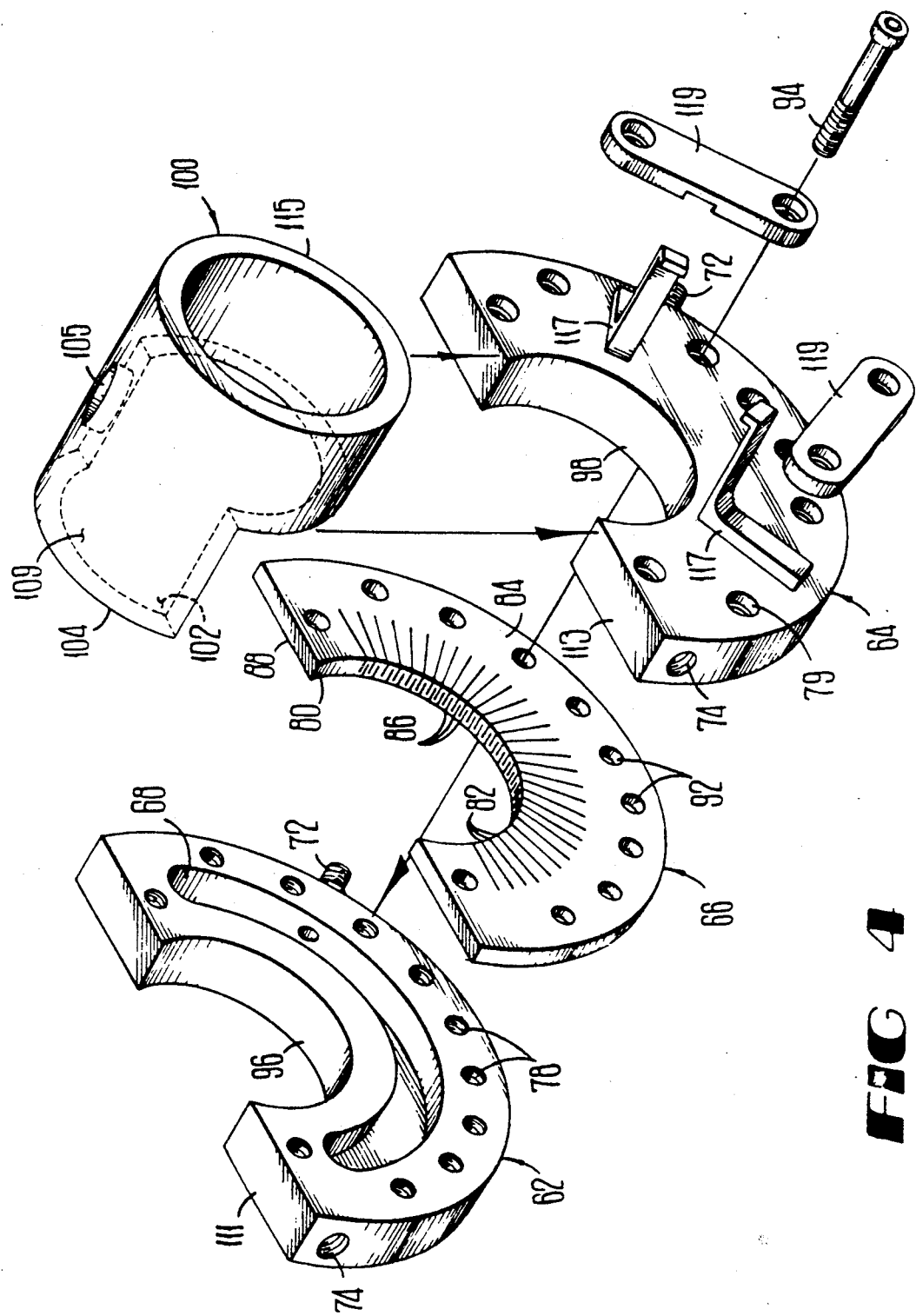
FIG. 4 is an exploded perspective view of portions of the torch assembly.

The torch assembly 50 in the perspective and exploded views shown in FIGS. 3 and 4 is comprised of first and second identical outer plate-like members 62 and 64, respectively, and a gas outlet plate 66, with the outer members having coextensive arcuate surfaces. The outer members 62 and 64 each have an arcuately shaped plenum 68 and an input conduit 72 communicating therewith. Also, the first and second outer members 62 and 64 each have a channel 74 connected to a connecting conduit 75 and to a cooling tube 76. A plurality of threaded holes 78—78 pass through the member 62 and a plurality of holes 79 pass through the member 64. The gas outlet plate 66 includes an inner arcuate surface 80.

As can be seen in FIGS. 3 and 4, the gas outlet plate 66 has a first plurality of radially disposed grooves or slots 82—82 machined in a first major surface 84 and a second plurality of radially disposed grooves or slots 86—86 machined in a second major surface 88. The grooves 82 and 86 open to the surface 80. The gas outlet plate 66 also has a plurality of holes 92—92 therethrough which become aligned with the holes 78—78 and 79—79 of the outer members 62 and 64 when the outer members are assembled with the gas outlet plate.

FIG. 3 is a perspective view of the torch assembly 50 which is assembled by capturing the planar gas outlet plate 66 between the outer members 62 and 64 and securing the component parts together with a plurality of bolts 94—94 which pass through the holes 78, 79 and 92. It can be seen from FIG. 3 that the planar gas outlet plate 66 separates the two plenums 68—68 and that the radial lengths of the grooves is sufficient to communicate from the vicinity of arcuate outer surfaces 96 and 98 of the torch assembly 50 to the plenums 68—68 of members 62 and 64, respectively. Although in an embodiment shown in FIGS. 3 and 4, the grooves 82 and 86 are interleaved, other arrangements such as aligned grooves or offset grooves can be used effectively depending on factors, such as, for example, the gases used, the surface mixing required, and the desired temperature.

In a particular exemplary embodiment depicted in FIG. 3, the outer members 62 and 64, as well as the plate 66, were made of stainless steel and the tubing 76 was made of stainless steel. Of course, other suitable materials may be used.

In operation, a substrate tube 31 is supported by the headstock 33 and the tailstock 34 of the lathe 32 and is caused to be rotated. Then oxygen is directed into the plenum 68 of the outer member 62 via the conduit 72 while hydrogen is flowed into the plenum 68 of the outer member 64 via the conduit 72. The oxygen and the hydrogen gases are caused to pass from the plenums 68—68 and exit through the grooves 82 and 86, respectively, as alternating jets. The gases will mix at the surface 80 of the torch assembly 50 and are ignited to form a flame which is directed into engagement with the tube 31. The torch assembly 50 is moved repeatedly along the length of the substrate tube in a plurality of passes from the headstock 33 to the tailstock 34 to provide sufficient heat to fabricate an optical preform as described in detail in U.S. Pat. No. 4,217,027 which is incorporated by reference hereinto. A coolant, such as water, is passed through each tube 76, to maintain the temperature of the arcuate surface 80 low enough to prevent oxides from forming on the surface thereof to prevent subsequent ejection of particulate matter which can contaminate the surface of the preform during fabrication. Such particulate matter can adversely affect the strength of a fiber drawn therefrom. Although, the instant embodiment of each outer plate is connected to a coolant tube 76, various other techniques may be used. Also, although the exemplary torch assembly provides an oxygen-hydrogen mixture, other suitable gas combinations can be used.

Typically, the chemical materials for deposition are supplied to the substrate tube at its headstock end. Gases are exhausted at the tailstock end. In a deposition mode, the torch is moved in a plurality of passes from the headstock toward the tailstock.

After the deposition mode, the torch assembly is moved initially in two passes from the headstock 33 to the tailstock 34 in a collapse mode. During the collapse mode, the flow rates of the gases are increased substantially. Then the exhaust end of the preform tube is pinched off and the torch assembly moved in a pass from the tailstock to the headstock. Further as can be seen in FIG. 1, the straightening device 51 is provided with a roller 90. The roller 90 is moved into engagement with the preform tube at predetermined times during the collapse mode such as after the initial two passes of the collapse mode to cause the tube to be straightened. Such a roller and its operation are described in priorly mentioned U.S. Pat. No. 4,477,273 which is incorporated by reference hereinto. Subsequently, two additional passes are made from the tailstock to the headstock to complete the collapse of the preform tube into a preform rod having a diameter in the range of from about 16.5 mm to about 18.1 mm. From this rod, optical fiber is drawn. See U.S. Pat. No. 4,370,355, which issued on Jan. 25, 1983 in the name of P. J. Niesse and which is incorporated by reference hereinto.

The apparatus 30 of this invention includes additional features which cooperate with the portion of the apparatus described thus far to reduce the collapse time. The torch assembly includes a muffle tube 100 which is supported by the outer members 62 and 66 with an inner surface 102 of a portion 104 thereof being somewhat of a continuation of inner surfaces 96 and 98 of the outer plates. The muffle tube 100 includes an opening 105 to provide access to the preform tube for a pyrometer 106. An outer peripheral surface 109 of the muffle tube 100 has a radius greater than the inner radii of the outer torch members 62 and 64 with radial surfaces of the one portion 104 of the tube engaging radial portions 111 and 113 of the outer members.

Another portion 115 of the muffle tube 100 extends from the one portion 104 toward the headstock 33 and overhangs the outer member 64. It is supported by brackets 117—117 which are held in position by straps 119—119. The length of the overhang is determined as a function of carriage speed and the desired temperature profile of the heat zone 54.

It is preferred that the muffle tube overhang only that side portion of the torch assembly 50 which is oriented toward the headstock 33. This is required so that during relatively high speed passes when the maximum temperature portions of the heat zone 54 experience a maximum lag from the centerline of the torch, the maximum temperature portion will be enclosed by the muffle tube.

Overhang of the muffle tube also is important with respect to the amount of useable preform tube provided by the process of this invention. The useable portion of the preform tube begins several centimeters from the headstock. As a result, although an overhang of the torch assembly 50 at its headstock side prevents the torch assembly from engaging the headstock on each pass, this does not decrease the amount of useable preform. At the other end however, the useable preform begins at the tailstock. Therefore, if anything such as a muffle tube extension prevents the torch assembly from reaching the tailstock on each pass, there would be a reduction in the amount of useable preform. The magnitude of the reduction depends of course on the amount of the overhang, if any, on the tailstock side of the torch assembly.

The torch assembly 50 is configured to optimize the application of the zone of heat to the preform tube to collapse the tube into a preform rod. As can be seen in FIGS. 1 and 3, the arcuate surface 80 of the middle plate 66, that is the plate which is slotted to provide egress for the gases, is recessed between the outermost members 62 and 64. In other words, the radius of the innermost surface 80 of the slotted plate 66 is greater than the radii of the innermost surfaces of the outer members. In a preferred embodiment, the radius of the slotted plate of a conventional torch is increased by about 0.15 cm. In the preferred embodiment, the inner radius of each outer member 62 and 64 is 3.44 cm whereas the inner radius of the gas outlet plate that is, the radius to the surface 80 of the gas outlet plate to which the slots open is 3.59 cm.

A recessed gas outlet plate 66 in cooperation with the muffle tube 100 has been found to be advantageous both during deposition and collapse. As a result of the recessing, the maximum temperature portion of the heat zone is narrowed and hence is more concentrated than that of the prior art. During deposition, the flow rates of the gases are substantially less than during the collapse mode. This together with the muffle tube causes the zone of heat to be widened. However, during collapse, increased flow rates result in a narrow zone of heat. Also, the narrower the heat zone, the more controlled is the temperature profile and the less the time required to collapse the substrate tube.

In the operation of the apparatus 30 in a collapse mode, it is usual to use a first collapse pass in which the torch assembly is moved from the headstock toward the tailstock at a speed of 7.80 m/min. A second pass in the same direction is accomplished at a speed of 6.60 m/min. Third, fourth and fifth passes in an opposite direction, that is from the tailstock toward the headstock, are caused to occur at speeds of 4.8, 3 and 3 m/min, respectively.

At the higher speeds of the first two passes, the maximum temperature of the heat zone profile (see FIG. 2) lags the portion of the heat zone disposed between the two outer torch members 62 and 64. However, inasmuch as the muffle tube overhang is disposed on that side of the torch assembly 50 which is oriented toward the headstock, the maximum portion of the heat zone occurs within the overhanging portion of the muffle tube. As a result, maximum heat energy continues to be confined within the muffle tube circumferentially about the tube 31 notwithstanding the speed of the carriage 40. Hence the muffle tube 100 is effective to concentrate the heat energy to be applied to that portion of the tube which is disposed within the muffle tube.

In the last three passes during collapse, the carriage speed is less than during the first two. Therefore, even though the overhanging portion of the muffle tube 100 is disposed during those passes on the leading side of the torch assembly, the lag of the temperature profile from a symmetrically disposed profile is not that great. As a result, even during these passes, the zone of heat is confined substantially within the muffle tube 100.

The recessed gas outlet plate cooperates with the muffle tube 100 and its overhanging portion 115 to maximize the applied heat energy at the carriage speeds disclosed. It has been found that the amount by which the gas outlet plate is recessed is critical. If too little or if too much, the resulting preform may include excess curvature. It has been found that a recess on the order of about 0.15 cm is preferred and provides the best results.

What is important is the cooperation among the carriage speed, the amount of recess of the slotted plate 66 and the length of the muffle tube 100. One or all of these variables may be changed in order to control the temperature profile of the zone of heat and the time required in order to cause the preform tube to become collapsed into a preform rod. It has been found that the use of the methods and apparatus of this invention reduces the time required to collapse the preform tube into a rod by about twenty-five percent.

For the deposition mode, the heat zone is about the same as that found during deposition with a torch not having a muffle tube nor a recessed gas outlet plate. On the other hand, the use of a torch assembly having a muffle plate and recessed gas outlet plate allows the use of lower flow rates for the gases during deposition, thereby resulting in significantly lower gas consumption. Nevertheless, even though the flow rates are lower, the muffle tube reradiates heat energy and causes the heat zone to be about as broad as without the muffle tube and recess.

As mentioned earlier, the recessed gas outlet plate results in a narrowed heat zone. The relatively narrow heat zone cooperates with the muffle tube to provide higher temperatures. Further, during collapse, the gas flow rates are substantially greater than those used during deposition, but approximate those used for a torch not having a recessed gas outlet plate and muffle tube. Because of the cooperation among the narrower heat zone, the muffle tube and the higher flow rates, the forces of the gases on the preform tube are greater. This reduces the collapse time by about twenty-five percent.

The torch assembly 50 may be repaired simply by replacing any of the three basic components, i.e., the outer members 62 and 64 and the gas outlet plate 66. Furthermore, the heat zone and the flame pressure areas provided by the torch assembly 50 may be modified by simply changing the size of the grooves 82 and 86 and/or the thickness of the gas outlet plate 66 and or by the amount by which the gas outlet plate is recessed.

Figure 5:
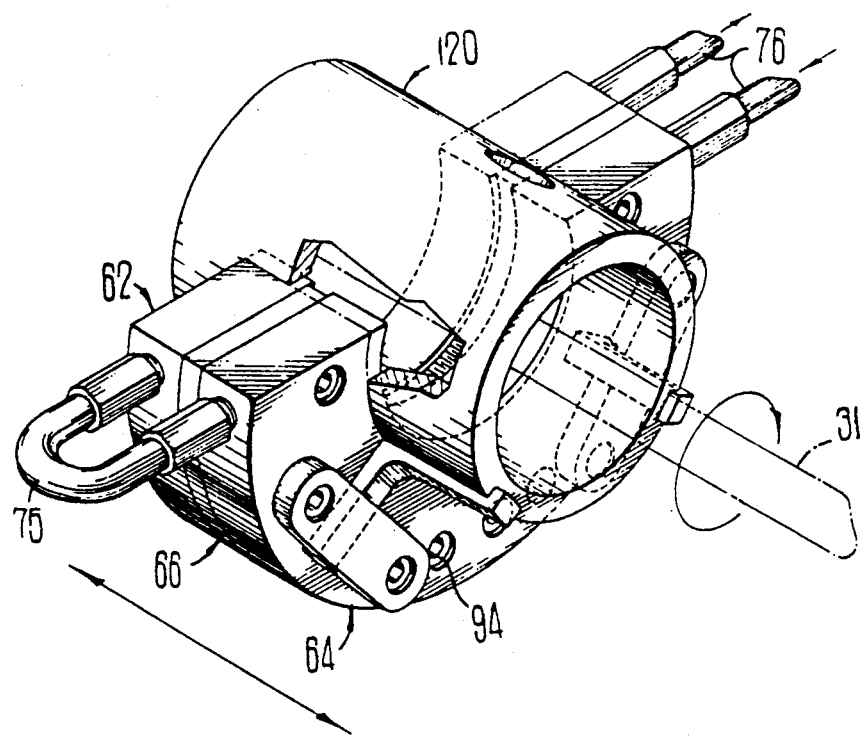
FIGS. 5 and 6 are alternative embodiments of the muffle tube.

Although the muffle tube 100 in the preferred embodiment is caused to overhang one of the outer members 62 or 64, other embodiments may be used. In FIG. 5 is shown a muffle tube 120 which overhangs both side members 62 and 64. Remembering that the side member 64 is oriented toward the headstock, the overhang of the muffle tube 120 from the side member 64 may be greater than that past the side member 62.

Figure 6:
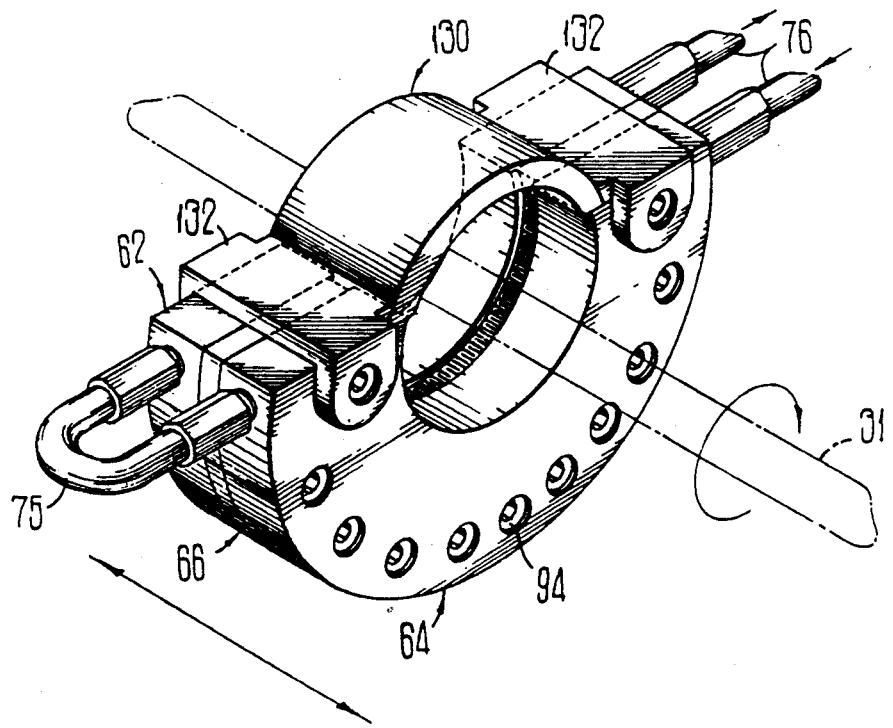

In FIG. 6, there is shown another embodiment of a muffle tube. Therein a muffle tube 130 is caused to extend only from an outer surface of one side member 62 to an outer surface of the other side member 64. The muffle tube 130 is held in position by clamps 132—132.

It is understood that the above-described arrangements are simply illustrative of the invention. Other arrangements may be devised by those skilled in the art which will embody the principles of the invention and fall within the spirit and scope thereof.

I claim:

1. An apparatus for heating a glassy tube, said apparatus comprising:

means for supporting a glassy tube having a longitudinal axis for rotation about its longitudinal axis;

torch means including a plurality of passageways for directing a flow of combustible gases toward said tube to provide a zone of heat, said tube being supported to cause the tube to extend transversely past a first arcuate surface of said torch means which circumscribes partially a portion of the length of the tube and the gases being directed toward the first arcuate surface of the torch means and toward the portion of the length of the tube;

means for cooling at least those portions of said torch means which define said passageways which are adjacent the tube to inhibit contamination of said torch means and thereby prevent contamination of the tube;

muffle means being mounted on said torch means and moved therewith and cooperating with said first arcuate surface of said torch means and having at least one overhang for providing confinement of the tube and the heat about substantially the entire circumference of the tube along a portion of the length of the tube which exceeds the length confined by the first arcuate surface of said torch means and an additional portion of the tube which extends beyond the torch assembly to control the temperature profile along the tube, said muffle means including an arcuate surface spaced equidistantly from the peripheral surface of the tube for confining the peripheral surface of the tube;

means for causing relative motion between the tube and said torch means and said muffle means along the tube to cause successive portions of the length of the tube to be heated;

means including a second arcuate surface of said torch means and through which the flow of combustible gases passes process which second surface is recessed in the torch assembly from the first arcuate surface for confining the combustible gases for a predetermined distance along flow paths of the gases after the gases emerge from the passageways to cause the gases to be directed from the torch means toward the tube in a manner which restricts the width of the zone of heat as measured along the longitudinal axis and to maximize the heat energy applied to the tube to accelerate the collapse of the tube into a rod; and means for rotating the tube about its longitudinal axis.

2. The apparatus of claim 1, wherein said torch means includes a gas outlet plate which includes first and second pluralities of slotted passageways along which gases are capable of flowing;

first and second outer plate members arranged such that the gas outlet plate is captured therebetween;

each outer member having a cavity therein which opens toward said gas outlet plate;

inlet means for directing gas into each cavity; and the gas outlet plate being slotted on each major surface thereof, arranged in an interleaved relationship, the slots extending from the respective cavities in the outer members to an inner arcuate edge surface of the gas outlet plate to form a plurality of gas outlets.

3. The apparatus as set forth in claim 2, wherein:

inner and outer edge surfaces of the gas outlet plate are arcuate in shape; and the slots are disposed radially in said gas outlet plate; and wherein said torch means further includes a channel in each of said outer members for communicating between the respective cavities and a source of gas.

4. The apparatus of claim 1, wherein said torch means comprises:

a gas outlet plate;

first and second outer members separated by the gas outlet plate fixedly mounted therebetween, said outer members having at least one coextensive arcuate surface;

said first and second outer members each having a plenum therein with each plenum having means for communicating with a different gas source; and said gas outlet plate having a plurality of radially spaced slots on each major surface thereof, which slots are arranged in an interleaved relationship, and which extend from the plenums to an arcuate surface of said gas outlet plate to form a plurality of gas outlets.

5. The apparatus of claim 4, wherein said gas outlet plate has an inner arcuately shaped portion to which said slots open, said inner arcuately shaped portion having a radius which is larger than the radii of arcuately shaped inner surfaces of said outer members.

6. The apparatus of claim 5, wherein said tubular means is disposed across the width of said torch means and includes a portion which overhangs said torch means on one side thereof, said tubular means cooperating with said arcuate surface of said torch means to confine substantially the entire circumference of the tube which is disposed between major side surfaces of said torch means and solely being effective in the overhanging portion to confine the entire circumference of an additional portion of the tube.

7. The apparatus of claim 5, wherein said torch means is adapted to be moved in a first plurality of passes from one end of the tube to the other end of the tube with a leading side of said torch means preceding a trailing side of said torch means separated from the leading side by the width of said torch means, and wherein said muffle means includes a portion which overhangs said trailing side.

8. The apparatus of claim 5, wherein said muffle means includes first and second portions, said first portion of said muffle means being partially tubular and cooperating with an inner arcuate portion of said torch means to enclose the entire circumference of the portion of the tube which extends between major side surfaces of said torch means and a second portion which is tubular, which overhangs one of the major side surfaces of said torch means and which encloses substantially the entire circumference of a portion of the tube beyond the one major side surface.

9. The apparatus of claim 1, wherein said muffle means extends beyond each of two parallel outer major surfaces of said torch means.

* * * * *